(No Model.)
V. COOMBE.
HANK.
No. 250,426.  Patented Dec. 6, 1881.
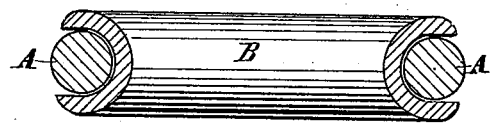
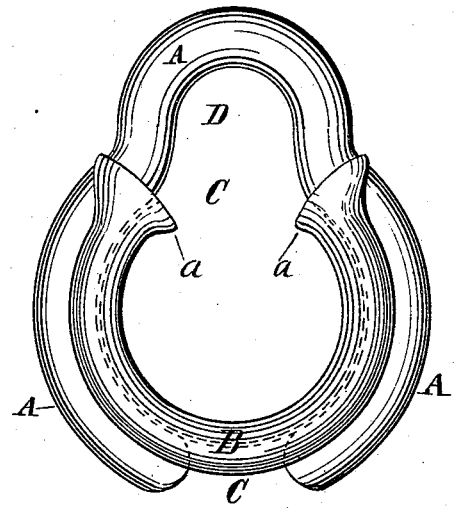
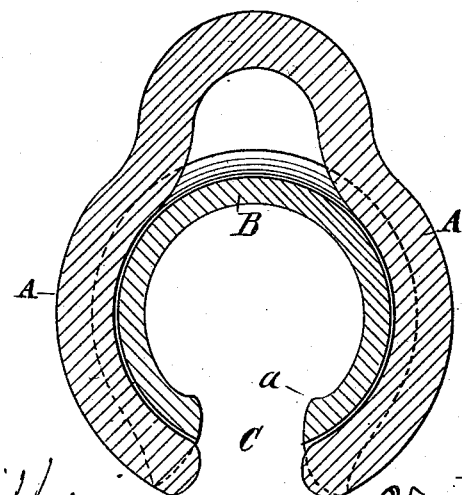
Witnesses
Robt. S. Miller
Newton Wyckoff
Inventor
Vivian Coombe
By Philip T. Dodge
Atty.

UNITED STATES PATENT OFFICE.

VIVIAN COOMBE, OF LIVERPOOL, COUNTY OF LANCASTER, ENGLAND.

HANK.

SPECIFICATION forming part of Letters Patent No. 250,426, dated December 6, 1881.

Application filed October 31, 1881. (No model.) Patented in England October 25, 1879.

*To all whom it may concern:*

Be it known that I, VIVIAN COOMBE, of Liverpool, in the county of Lancaster, England, have invented certain new and useful Improvements in Sail Hanks or Shackles, (for which I received Letters Patent of Great Britain and Ireland, dated October 25, 1879, No. 4,350;) and I do hereby declare that the following is a full, clear, and exact description of the same, reference being had to the accompanying drawings, in which like letters indicate like parts.

Figure 1 represents my hank with its parts adjusted in position for use; Fig. 2, a section of the same as it appears when opened; Fig. 3, a cross-section of the same.

The object of this invention is to provide for sails a fastener that does not require stitching, roving, or its equivalent.

The device consists of two annular members, each with an opening on one side, fitted one to turn within the other, so that by bringing their openings in line with each other the eye or ring to be held may be inserted through the side into the central opening, and then secured by turning the inner part until it is brought out of line with the outer part. In order to prevent the parts from being accidentally brought into position to permit the escape of the eyelet or other device held by it, the central member will be provided with inwardly-projecting lugs at the edges of its opening, or the opening made of irregular form, so that the strain of the eyelet will tend to keep the parts in a closed position.

A represents the outer member of the device, having arms curved in a substantially circular form, with an opening, C, between their ends.

B represents the inner member, also provided with an opening in one side and grooved in its periphery to receive the arms of member A, which are seated therein, as represented in the drawings, the arrangement being such that the inner member may revolve, subject to a moderate degree of friction, within the outer member.

In order to secure the best results, the arms of the outer member should embrace the inner member with a sufficient degree of pressure to prevent the parts from being turned accidentally.

It will be readily seen that by turning the part B until its opening coincides with the opening in the part A, as shown in Fig. 2, the eyelet, ring, or other device to be held may be readily inserted into the central opening, and that by turning the inner part it may be caused to close the opening in the outer part, as represented in Fig. 1, and thus prevent the escape of the device held thereby.

In order to permit the convenient attachment of the device and prevent the liability of its being detached when opened, an enlargement or ear, D, may be formed on one side, as shown. It will be observed that the inner member, B, is provided with inwardly-extending shoulders or enlargements *a* at the edges of its opening. These shoulders, by coming in contact with the ring or other device, will tend to prevent the inner member from being turned in such position as to permit the escape of the ring. Instead of making use of the shoulders, the central opening of the part B may be of angular or irregular form, so that the ring or other device held thereby will engage therein and hold it, when under strain, in a closed position.

In Fig. 2 the dotted lines indicate the central device with an elliptical or elongated opening, which will answer the purpose of retaining it in a closed position when under strain.

It is obvious that the device may be modified in form and size and adapted for many uses besides that of a sail-hank, being generally applicable wherever a shackle or coupling device is required.

Having thus described my invention, what I claim is—

1. In a sail hank or shackle, the combination of the member A, having circular curved arms and the eye or shank D, in combination with the inner rotating member, B, open on one side.

2. In combination with the clasp A, the inner rotary member, B, provided with the shoulders *a*, or their described equivalent, whereby the accidental opening of the device is prevented.

VIVIAN COOMBE.

Witnesses:
J. OWDEN O'BRIEN,
CHARLES SOUTHALL.